United States Patent
Jones

Patent No.: US 6,175,822 B1
Date of Patent: Jan. 16, 2001

(54) METHOD AND SYSTEM FOR PROVIDING NETWORK BASED TRANSCRIPTION SERVICES

(75) Inventor: Bryce Alan Jones, Overland Park, KS (US)

(73) Assignee: Sprint Communications Company, L.P., Kansas City, MO (US)

(*) Notice: Under 35 U.S.C. 154(b), the term of this patent shall be extended for 0 days.

(21) Appl. No.: 09/093,011

(22) Filed: Jun. 5, 1998

(51) Int. Cl.[7] ............. G10L 11/00; G10L 21/00; G11B 21/12; H04M 1/64; H04N 1/024
(52) U.S. Cl. ............. 704/270; 275/500; 275/201; 275/278; 369/25; 369/29; 369/24; 379/75; 178/21
(58) Field of Search ................... 705/34, 10, 14, 705/26; 704/270; 369/25, 29, 27; 379/92, 142; 709/200, 202

(56) References Cited

U.S. PATENT DOCUMENTS

| | | | |
|---|---|---|---|
| 4,989,233 | * 1/1991 | Schakowsky et al. | 379/142 |
| 5,721,908 | * 2/1998 | Lagarde et al. | 709/202 |
| 5,828,730 | * 2/1999 | Zebryk et al. | 369/25 |
| 5,875,436 | * 2/1999 | Kikinis | 369/24 |

OTHER PUBLICATIONS

"Audio and Video over the Internet", Computer Telephony, Mar. 1996.*
"iDictate.com", http://www.idictate.com, Merch 1997.*
N/A, "TranScribe: e–chart—Easier Health Care Documentation & Communication," http://www.e–chart.com/welcome.html, TranScribe, Inc., p. 3, (May 11, 1998).

* cited by examiner

Primary Examiner—Tãlivaldis I. Šmits
Assistant Examiner—Daniel A. Nolan
(74) Attorney, Agent, or Firm—Harley R. Ball; Steven J. Funk

(57) ABSTRACT

A method and system of providing network based transcription of free-form speech signals. A speech signal is recorded as a digital audio file in a storage medium and is then streamed over a data network to a client terminal for transcription. As the speech signal arrives, it is buffered in memory at the client terminal while a streaming player application plays the signal to a transcriptionist. The transcriptionist then conveniently listens to and transcribes the speech signal as it is being played. The invention advantageously avoids the need to physically transfer and download the full digital audio to a transcriptionist computer or to transport physical storage media, such as tapes or CD-ROM from the place of recording to the place where the recorded voice signals will be transcribed.

32 Claims, 3 Drawing Sheets

METHOD AND SYSTEM FOR PROVIDING NETWORK BASED TRANSCRIPTION SERVICES

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the recording and transcription of audio signals, and more particularly to a method and system for providing network based transcription of free-form speech signals.

2. Description of the Related Art

In many areas, it has often been necessary to translate spoken language into written words. Long before the advent of recording devices such as audio tape, words were taken down with stenography or shorthand as they were spoken. Over time, the introduction and widespread availability of recording devices such as audio tape facilitated recording of spoken words and later listening to and transcribing the words into written form.

Transcription of free-form speech from audio tapes or other physical storage media has become commonplace. In office settings, for instance, a worker commonly dictates a letter to tape and then gives the tape to an assistant for transcription. The assistant in turn places the tape in a player, listens to the recorded speech, and types the spoken words on a typewriter or computer for subsequent processing.

More recently, transcription of free-form speech has been used in connection with telecommunications voice service platforms, for instance, to record free-form speech responses to survey questions. For example, a telecommunications service carrier may provide an enhanced services platform to which callers can connect by dialing toll free phone numbers that are respectively associated with various promotional campaigns. Once connected, for a given promotional campaign, the platform may automatically play messages about a specified product or service and then ask the caller questions.

As the caller responds to these questions, the enhanced services platform will typically record the caller's free-form spoken responses as digital audio files. In turn, workers for the carrier may regularly copy the digital audio files into analog form on tapes (or digital form on CD-ROM), label those tapes to correspond to the respective promotional campaigns, and then ship the tapes to a specialized transcription agency for transcription. In turn, at the transcription agency, skilled transcriptionists play the tapes associated with specified campaigns and transcribe the spoken voice responses into written words for subsequent tabulation and analysis.

Alternatively, the enhanced services platform may compress the digital audio files and then ship computer disks of these compressed files to the transcriptionist agency or electronically transfer the full compressed files to the transcriptionist agency. At the transcriptionist agency, workers may in turn download the digital audio files in full onto computer disk drives. Transcriptionists may then work at those computers, running applications that decompress the stored files and play the decompressed speech signals for transcription.

Unfortunately, the existing methods of recording and transcribing free-form speech signals are deficient. For instance, the process of transferring the recorded speech signals to tapes, labeling those tapes and physically transferring the tapes to a transcription agency is costly, lengthy and prone to error. Further, tapes can be misplaced, lost or damaged in transit to the transcription agency. Still further, tapes can be inadvertently disassociated from their respective surveys, thereby likely rendering the voice responses useless. Yet further, with large promotional campaigns, hundreds of tapes may be generated and shipped per week, and these tapes may be discarded after use, thereby wasting valuable resources.

Additional problems arise when digital audio files are transferred in full to a transcriptionist and then stored on computer hard disks for subsequent playback and transcription. For instance, space limitations on the local computer hard disks may necessarily restrict the ability to store such files, particularly where the files are large. Further, the process of transferring the digital audio files to the transcriptionist agency and then downloading the files in full on computer hard drives or other storage media for subsequent playback is time consuming. Still further, transcription of the recorded speech signal will not begin until after the entire file has been downloaded and played back.

Similar deficiencies exist in other applications of transcription as well. For instance, in an office setting, even the most simple task of dictating and transcribing a letter can be complicated by the process of physically transferring the recorded tape to an assistant for transcription. In some cases, the assistant may not be conveniently located in relation to the person dictating the letter. As a result, the process of transferring the recorded tape can be lengthy. Further, problems can arise in tracking multiple tapes and associating those tapes with their sources and subjects.

Due to the deficiencies in the existing art, a need exists for an improved, more efficient method and system to facilitate transcription of free-form speech signals.

SUMMARY OF THE INVENTION

The present invention provides an improved method and system for transcription of free-form speech signals. According to the invention, a speech signal is recorded as a digital audio file in a storage medium and is then streamed over a data network to a client terminal for transcription. As the speech signal arrives, it is buffered in memory at the client terminal while a streaming player application plays the signal to a transcriptionist. The transcriptionist then conveniently listens to and transcribes the speech signal on the fly, as it is being streamed.

Advantageously, the invention thus avoids the need to physically transfer and download the full digital audio file to a transcriptionist computer or to transport physical storage media, such as tapes or CD-ROM from the place of recording to the place where the recorded voice signals will be transcribed. As a result, the invention avoids the costs and other deficiencies associated with shipping and disposing of the storage media, and the invention facilitates quicker, more efficient transcription.

It is thus an object of the invention to provide a method for network based transcription of a voice signal, including receiving the voice signal, storing a digital audio file representing the voice signal in a file store associated with a server, having the server stream the digital audio file over a network to a client terminal, having the client terminal audibly play the voice signal represented by the digital audio file as the file is received, and having a user at the client terminal listen to and transcribe the voice signal as it is played.

It is another object of the invention to provide a method of transcribing a voice signal, including recording the voice signal on a storage medium accessible over a data network, having a server on the network respond to a request for the voice signal by streaming the voice signal over the data network to a client terminal, having a user at the client terminal operate streaming controls and selectively listen to and transcribe the voice signal.

It is still a further object of the invention to provide a system for network based transcription of a voice signal, including a file store, a server coupled to a network and to the file store, the server receiving and storing in the file store a digital audio file representative of the voice signal and, in response to a request from a client terminal on the network, streaming the digital audio file over the data network to the client terminal, the client terminal receiving and audibly playing the voice signal represented by the streamed digital audio file as it arrives, and a user at the client terminal transcribing the voice signal audibly played by the client terminal.

These as well as other advantages of the present invention will become apparent to those of ordinary skill in the art by reading the following detailed description, with appropriate reference to the accompanying drawings.

BRIEF DESCRIPTION OF THE DRAWINGS

Preferred embodiments of the present invention are described herein with reference to the drawings, in which.

DETAILED DESCRIPTION OF THE PREFERRED EMBODIMENT

Figure 1:
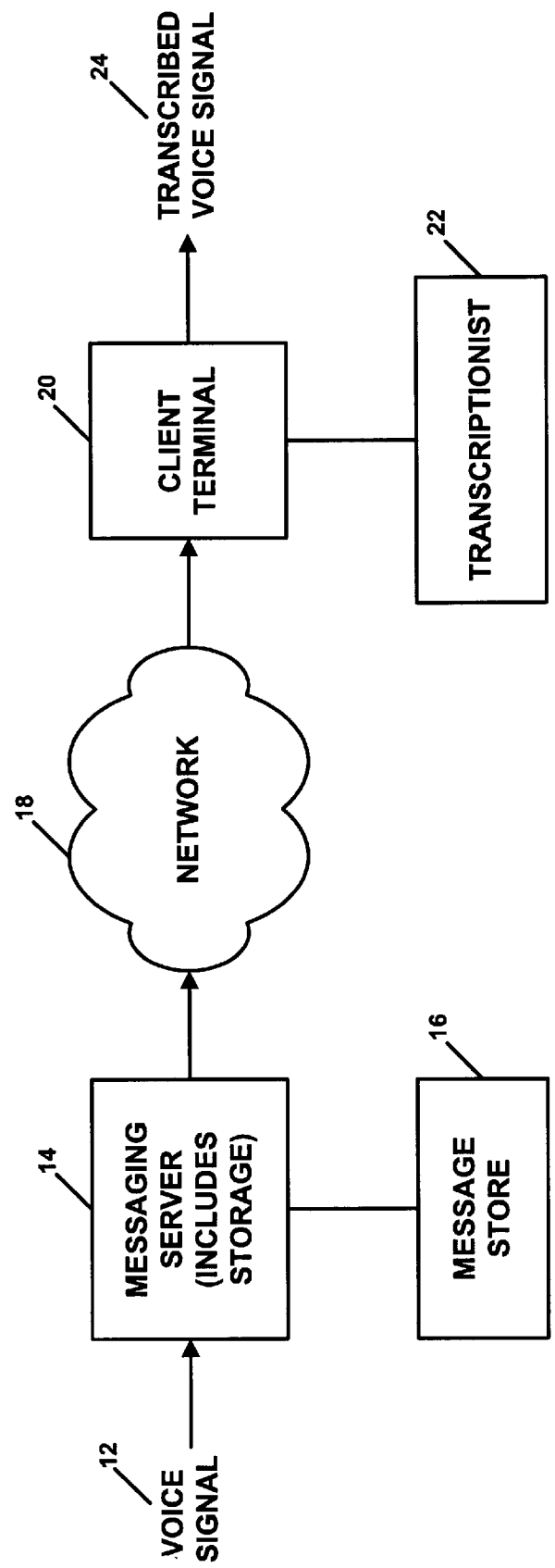
FIG. 1 is a block diagram depicting a network based transcription system operating in accordance with a preferred embodiment of the present invention.
Figure 2:
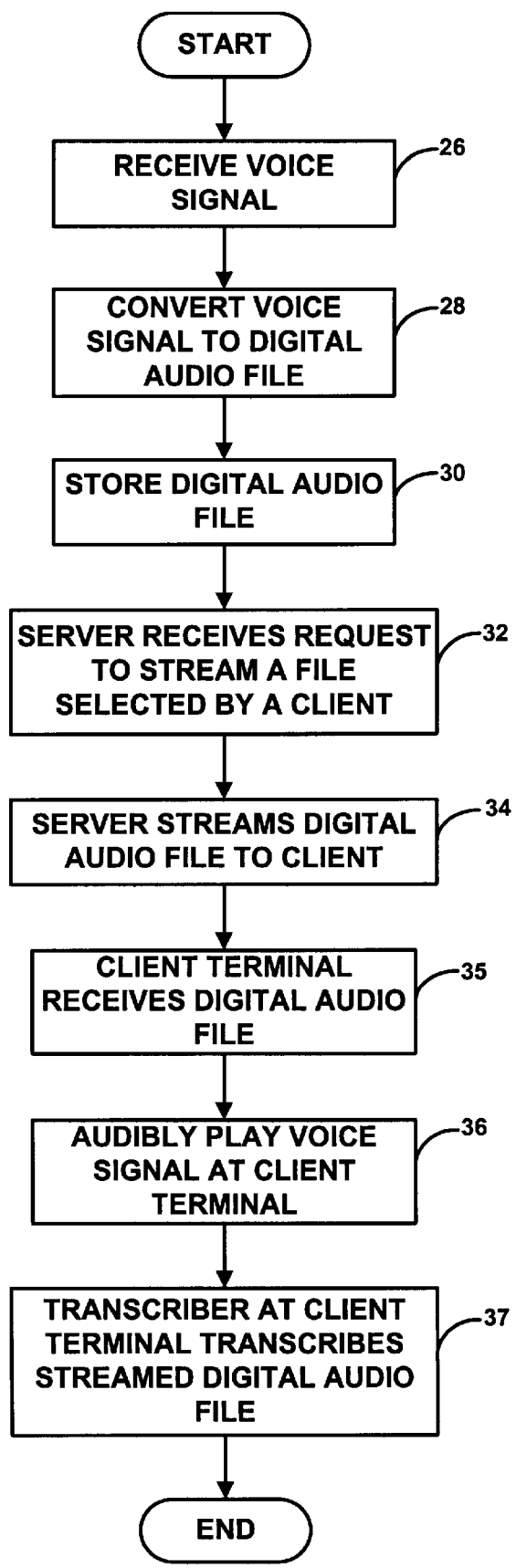
FIG. 2 is a flow chart of the process steps performed by a network based transcription system operating in accordance with a preferred embodiment of the present invention.

Referring to the drawings, FIGS. 1 and 2 provide a general structural and functional overview of a network based transcription system operating in accordance with the present invention. As shown generally in FIG. 1, according to the preferred embodiment, a captured voice signal 12 arrives in the form of a digital audio file at a messaging server 14. Messaging server 14 is coupled with a message store 16 and stores the digital audio file in the message store 16. Messaging server 14 is further coupled with a network 18 and is configured to stream audio files, such the digital audio file representing voice signal 12, via the network 18, to a remote network location.

In turn, a client terminal 20 is coupled to network 18 and is configured to receive and play streamed audio files, such as the digital audio file representing voice signal 12, from network 18. A transcriptionist 22 then works at client terminal 20 and selectively listens to and transcribes the audio signals as the signals are streamed over the network 18 by messaging server 14. Thus, as messaging server 14 streams to client terminal 20 the digital audio file representing voice signal 12, the transcriptionist 22 listens to and transcribes the voice signal, thereby producing a transcription 24 of the voice signal.

Similarly, as shown generally by the flow chart of FIG. 2, at step 26, the system of the preferred embodiment operates by first receiving a voice signal. At step 28, the system then converts the voice signal to a digital audio file. Next, at step 30, the system stores the digital audio file in message store 16, which is associated with messaging server 14. At step 32, messaging server 14 receives a request to stream the digital audio file to client terminal 20, and, at step 34, messaging server 14 responsively streams the digital audio file to client terminal 20. At step 35, as the messaging server 14 streams the digital audio file to the client terminal, the client terminal receives the streamed digital audio file. In turn, at steps 36–37, the transcriptionist 22 works at the client terminal 20 as the underlying voice signal is played, selectively listening to and transcribing the voice signal and thereby producing a transcribed voice signal 24.

For purposes of the present invention, the network 18 over which the messaging server 14 transmits the digital audio file to client terminal 20 may be any data network now known or later developed. In the preferred embodiment, however, network 18 is a packet switched IP computer network that operates according to the well known TCP/IP transmission protocol. Without limitation, examples of such networks include the Internet, company-wide intranets, and many Ethernet local area networks.

Typically, such networks pass data via the x.25 packet switching protocol over T1 or other suitable transmission lines and include routers and security firewalls in a well known configuration. In addition, such networks may be extended to include point-to-point connections to computers over conventional telephone lines, for instance, according to the well known point-to-point protocol (PPP) or serial-line-interface-protocol (SLIP). Computers or terminals connected to a network by such extensions are then considered nodes on the network.

Those skilled in the art will appreciate that network 18 may take other forms as well, consistent with the present invention. In general, for instance, network 18 may be any local area network, wide area network or combination of such networks, and the network 18 may include a conventional computer network or public switched telephone network. Further, network 18 may carry data along wired connections and/or wireless connections of any form now known or later developed.

Messaging server 14 is preferably a computer server accessible by client machines over network 18. Messaging server 14 manages the storage and transfer of data files such as digital audio files. In the preferred embodiment, messaging server 14 is a conventional file server, such as the Compaq Proliant 5500, manufactured by Compaq Computer Corporation.

As noted above, messaging server 14 is coupled with file store or message store 16. Message store 16 may be any storage medium capable of storing digital audio files, such as, for instance, a hard disk drive, a removable magnetic disk, a tape, or electronic, magnetic, optical or other memory. In addition, although FIG. 1 depicts message store 16 as external to messaging server 14 (preferably communicating with message server 16 according to the Fibre Channel standard developed by the American National Standards Institute (ANSI)), message store 16 may alternatively be internal to or an integral part of messaging server 14. In the preferred embodiment, message store 16 serves as a database capable of storing digital audio files and may take the form of a Network Appliance model NETAPP F630, made by Network Appliance of Santa Clara, Calif.

In the preferred embodiment, messaging server 14 receives digital audio files and stores those files in message store 16. In accordance with the invention, such digital audio files represent voice signals that will be streamed over network 18 for transcription at client terminal 20. The source of these digital audio files is not critical. The files may originate from any of a variety of sources. As one example, a digital audio file may originate from a multimedia client computer situated on network 18, which is equipped with a microphone and memory for receiving and recording speech signals. Upon receipt of a speech signal, the client computer will digitize the signal and forward the signal to messaging server 14 for storage in the form of a digital audio file. Depending on available storage space in message store 16, it will be understood that this digital audio file may be stored in compressed or uncompressed format (such as a conventional wave file, for instance).

In turn, client terminal 20 is preferably a computer connected to network 18 and capable of communicating with messaging server 14 via the network. For instance, client terminal may be a Dell Optiplex GXPro, manufactured by Dell Computer Corporation, and is preferably connected to network 18 by at least a 28.8 kpbs asynchronous dial-up line. In the preferred embodiment, client terminal 20 is a multimedia computer, equipped with an advanced microprocessor (such as an Intel Pentium II, or faster), a sound card (such as a Soundblaster or compatible card), a set of speakers or a headset to audibly provide audio signals, a display monitor, and sufficient memory and software to receive and play digitized audio signals being streamed from messaging server 14.

In the preferred embodiment, messaging server 14 and client terminal 20 communicate with each other in a web server to browser relationship. In this configuration, messaging server 14 operates as a web server to clients on network 18, typically providing hypertext markup language (HTML) encoded web pages to web browsers operating at those clients. In turn, client terminal 20 preferably runs a browser application adapted to communicate over network 18 with the web server. Illustrative examples of such a browser presently include Internet Explorer by Microsoft and Netscape Navigator by Netscape, both of which are well known to those skilled in the art.

According to the present invention, messaging server 14 advantageously transmits digital audio files representing speech signals to client terminal 20 by streaming the files over network 18. The process of streaming audio or video files is well known to those skilled in the art and involves transmitting the files to a receiving end when instructed by the receiving end. For instance, the receiving end may instruct the transmitting end to "play" (stream) an audio file. The transmitting end will accordingly begin transmitting the audio file to the receiving end over the network, and the receiving end will buffer as much of the streamed signal as possible in memory, over time continuously playing the recorded audio through speakers and buffering more of the incoming file to memory. At any time, the receiving end may then instruct the transmitting end to "pause" or "stop" playing the streamed signal, in which case, the transmitting end may stop transmitting the audio file (or may finish filling the available buffer at the client), and the receiving end will stop playing the buffered signal. Similarly, the receiving end may alternatively instruct the transmitting end to "rewind" or "fast-forward" the streamed signal, in which case the transmitting end will respond by streaming a time shifted portion of the audio file to the receiving end as instructed. Other, more detailed, mechanics of streaming are well known to those skilled in the art and therefore will not be described.

To facilitate streaming of digital audio files over network 18, messaging server 14 acts as a streaming server. To do so, for instance, messaging server 14 may run either Microsoft NetShow Server version 2.0 or better (manufactured by Microsoft Corporation), or RealNetwork RealServer version 5.0 or better (manufactured by RealNetworks, Inc.) In turn, the web browser running on client terminal 20 is preferably configured with an associated streaming player application (or "helper" application), which the browser may launch when necessary to receive, buffer and play incoming streamed audio files. Alternatively, for instance if client terminal 20 is not running a web browser, client terminal 20 may be configured with a standalone streaming client or application, which is itself configured to receive and buffer incoming streamed audio files from a streaming server such as messaging server 14.

Illustrative examples of streaming player "helper" applications and standalone streaming clients are available from Microsoft Corporation (e.g., NetShow Player version 2.1) and from RealNetworks, Inc. (e.g., RealAudio Player Plus) and are well known to those skilled in the art. Typically, such streaming devices provide a set of streaming controls on the display monitor of client terminal 20 as part of a graphical users interface, which a user may actuate by pointing and clicking a mouse cursor. These streaming controls usually include a play button, a pause button, a stop button, a fast-forward button and a rewind button, which enable a user to selectively play and listen to the streamed audio signals either as the signals (files) are being received or after the signals have been received. As these controls are actuated, the streaming application transmits appropriate instructions to the transmitting end to control the flow of the audio files.

In practice, according to the preferred embodiment, a transcriptionist works at client terminal 20, interacting with the web browser application. By navigating through web pages or other transmissions provided by messaging server 14, the transcriptionist may select a digital audio file to be streamed to client terminal 20 for transcription. For example, messaging server 14 may provide a web page or other transmission that lists available files, from which the transcriptionist may select a desired file. Each filename on this list may be encoded with a hyperlink to a uniform resource locator (URL), which, when selected, may specify to the browser that the associated file calls for the browser to launch a designated streaming player application. For instance, a URL with the "asf" extension may signal that the browser should launch Microsoft NetShow in order to receive and play the streamed file. Alternatively, a URL with the extension "ra" may signal that the browser should launch the Real Audio streaming player application to receive and play the audio file.

In the preferred embodiment, messaging server 14 may password protect individual audio files or groups of audio files and may in turn authenticate users or terminals that seek to receive these files via streaming. In addition, messaging server 14 may encrypt various audio files to protect the files from being received and played by unauthorized users.

Methods of password protection and authentication, as well as methods of encryption, are well known to those skilled in the art and therefore will not be described.

As the transcriptionist selects a desired audio file, the web browser launches the associated streaming player application, while the messaging server 14 begins to stream the compressed audio file over the network to the client terminal 20. As the digital audio file arrives at client terminal 14, the file is buffered in memory by the browser's streaming player application. By operating the streaming controls (such as play, pause, stop, fast-forward and rewind), the transcriptionist then selectively causes the client terminal to play the voice signal represented by the digital audio file, and the transcriptionist conveniently transcribes the voice signal in substantially real time as it is being streamed to the client terminal. Beneficially, since the incoming audio file is buffered in memory and played "on the fly" for transcription, the client computer does not need to receive and save the whole file before transcription commences.

The method and system of network based transcription provided by the present invention may be optimally employed in a variety of contexts. As one illustrative example, the invention may be used to provide transcription of voice responses recorded by a telecommunications enhanced services platform (ESP). As discussed in the background section above, telecommunications service carriers may implement a ESP in their network to facilitate promotions for various customers. Often, such promotions will ask individuals to call a toll-free phone number (such as an 800, 888 or 877 number), for instance, to participate in a survey. Upon receipt of the call, the ESP will typically play a series of recorded questions or voice prompts to the caller and then record the caller's free-form verbal responses to the questions in digital audio files. For instance, the ESP may ask the caller for comments about a specified product, and the caller may respond, "I use the product every day and tell all my friends about it."

In order to tabulate and analyze the free-form voice responses to the survey questions, the complete recorded voice responses are shipped or transferred from the ESP to a transcription agency, where transcriptionists in turn playback the recorded files and transcribe the callers' spoken words. In order to avoid the various deficiencies noted above with respect to the existing system, the present invention may be beneficially employed to provide for network based transcription of voice responses captured by such platforms.

Figure 3:
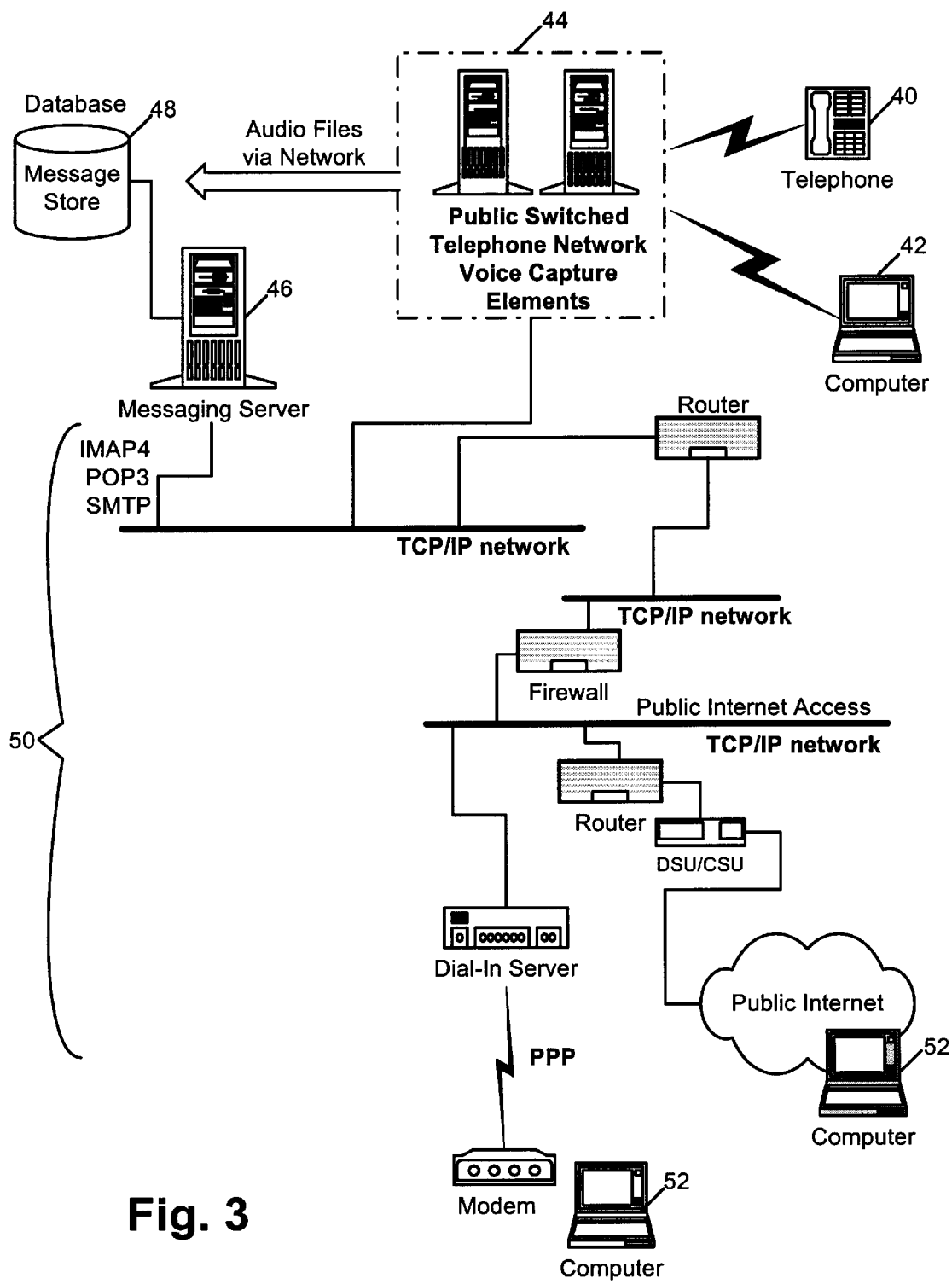
FIG. 3 is a block diagram depicting the structure of an illustrative network based transcription system operating in accordance with a preferred embodiment of the present invention.

FIG. 3 illustrates by way of example the structure of one such network based transcription system operating according to the preferred embodiment of the present invention. As shown in FIG. 3, a user operating a subscriber device such as a telephone 40 or multimedia computer 42 places a call to a specified 800 number in order to participate in a survey. In response, the user's call is connected via the public switched telephone network to an enhanced services platform 44, which consists of one or more voice capture elements 45. An example of one such voice capture element is manufactured by Brite Voice Systems, of Heathrow, Fla., and may include in a model DTP FTS DC-SYS chassis a QNX real-time operating system (made by QNX Software Systems, Ltd. of Ontario, Canada) and several sets of Dialogic D40B voice cards (made by Dialogic of Parsippany, N.J.) for recording voice signals and Dialogic DTI/124 T1 network interface cards for interfacing with the public telephone network.

The voice capture element(s) of ESP 44 will typically play a series of questions to the caller and record the caller's spoken responses as digital audio files on media servers. Since ESP 44 may be used to simultaneously offer a variety of different promotions, ESP 44 preferably associates given recorded voice responses with those respective promotions. ESP 44 may create this association, for instance, by using an appropriate file naming convention to name the digital audio files, or by storing the digital audio files in directories uniquely associated with specified promotions.

In the preferred embodiment, ESP 44 then transfers the digital audio files via the well known File Transfer Protocol (FTP) over a network to a messaging server 46 and message store 48. Messaging server 46 is preferably a Compaq Proliant 5500 or other high performance server. As the digital audio files are transferred to the message store, either ESP 44 or messaging server 46 preferably collates the files into directories in message store 48 uniquely associated with various promotions.

Messaging server 46 is coupled to a network 50, in order to facilitate streaming of the digital audio files to a remote client terminal for transcription. In this illustrative embodiment, network 50 is a TCP/IP network coupled through routers, firewalls and other TCP/IP networks to the public Internet. The client terminal is in turn conveniently located at any location coupled to network 50, in order to receive streamed digital audio files representing speech signals for transcription. As illustrated by way of example in FIG. 3, for instance, a client terminal 52 may be coupled to the Internet, and may be coupled either directly or through a point-to-point connection.

Alternatively, it will be appreciated that ESP 44 may itself function as the messaging server for purposes of streaming digital audio files to the client terminal for transcription. In that case, ESP 44 would preferably maintain and stream the digital audio files itself rather than providing the digital audio files to another messaging server to be stored and streamed.

According to the preferred embodiment of the invention, a transcriptionist works at client terminal 52 and launches a web browser associated with a streaming player application. Alternatively, the transcriptionist may launch a standalone streaming application at the client terminal. Through use of the browser or streaming application, the transcriptionist then accesses the messaging server 46 via the network 50. Once the client terminal 52 is in communication with the messaging server 46, the messaging server 46 preferably prompts the transcriptionist to enter a name and a password, and the messaging server 46 examines this information to verify that the transcriptionist has rights to access one or more directories or files in message store 48.

Following successful authentication, the messaging server 46 preferably displays a web page (or other transmission) that lists hyperlinks to digital audio files stored on message store 48, which are available to be streamed to client terminal 52. The transcriptionist may then select one of the listed hyperlinks, for instance, by pointing and clicking on the hyperlink. In response, the messaging server 46 advises the browser application to launch the corresponding streaming player application, and the messaging server 46 begins streaming the selected digital audio file to the client terminal 52. Alternatively, in the event client terminal 52 is running a standalone streaming player, the messaging server simply begins streaming the selected digital audio file to the client.

As messaging server 46 streams the selected digital audio file over network 50 to client terminal 52, the transcriptionist conveniently operates the streaming controls provided by the streaming player application, in order to selectively pause, stop, rewind, fast-forward, and again play the speech signal represented by the streamed audio file. In turn, as the transcriptionist listens to the voice responses played through a set of speakers or a headset at client terminal 52, the transcriptionist transcribes the responses by typing the responses into a word processing file at the client terminal.

It will of course be appreciated that the present invention is not limited to use in connection with telecommunication voice response services but may extend to other applications as well. As another example, for instance, the invention may be used the context of a corporate intranet or local area network, such as in an office setting. There, provided with a conventional computer network and streaming software, the invention can eliminate the need for a worker to dictate a letter to tape and physically give the recorded tape to an assistant for transcription. Instead, the worker may, for instance, record a voice signal as a digital audio file and pass that digital audio file to a network server for storage on the network. In turn, upon request, the network server may stream the digital audio file to an assistant's client terminal, where the assistant may selectively listen to and transcribe the incoming, buffered voice signal.

Preferred embodiments of the present invention have been illustrated and described. It will be understood, however, that changes and modifications may be made to the invention without deviating from the spirit and scope of the invention, as defined by the following claims.

What I claim is:

1. A method of providing network based transcription of a voice signal comprising, in combination:

receiving the voice signal;

storing a digital audio file representative of the voice signal in a file store associated with a server, the server being accessible over a data network, and the server being adapted to stream the digital audio file over the data network to a client terminal, the client terminal providing a plurality of streaming controls to enable a user at the client terminal to selectively play the voice signal represented by the digital audio file as the digital audio file is streamed to the client terminal;

the client terminal sending to the server a request to begin streaming the digital audio file over the data network to the client terminal;

the server receiving the request;

in response to the request, the server beginning to stream the digital audio file over the data network to the client terminal; and as the streamed digital audio file arrives at the client terminal, (i) the client terminal receiving the digital audio file and audibly playing the voice signal represented by the digital audio file and (ii) a user at the client terminal transcribing the voice signal audibly played by the client terminal, wherein the client terminal may send control signals to the server to pause and stop streaming of the digital audio file, and the server may respond to the control signals, respectively, by pausing and stopping streaming of the digital audio file over the data network to the client terminal.

2. A method as claimed in claim 1, wherein receiving the voice signal comprises receiving a call from a person via a telephone network and capturing a speech signal generated by the person, whereby the voice signal comprises a response to a voice prompt.

3. A method as claimed in claim 2, further comprising providing the voice prompt to the person via the telephone network, wherein the voice prompt is associated with a promotional survey, and wherein the voice signal comprises a response to the voice prompt.

4. A method as claimed in claim 1, wherein, before the message server streams the digital audio file to the client terminal, the message server authenticates the user.

5. A method as claimed in claim 1, wherein the data network is a local area network.

6. A method as claimed in claim 1, wherein the data network is a packet switched network, and wherein streaming the digital audio file over the data network to the client terminal comprises transmitting packets representative of the digital audio file over the data network.

7. A method as claimed in claim 6, wherein the data network is a TCP/IP network.

8. A method as claimed in claim 6, wherein the data network is an intranet.

9. A method as claimed in claim 6, wherein the data network is the Internet.

10. A method as claimed in claim 6, wherein the client terminal is coupled with said data network via a point-to-point protocol.

11. A method as claimed in claim 1, further comprising the client terminal operating a streaming-player application adapted to receive and play streamed digital audio files, the streaming-player application providing the plurality of streaming controls.

12. A method of transcribing a voice signal, the method comprising, in combination:

recording the voice signal on a storage medium accessible over a data network, the data network including a message server adapted to stream the voice signal to a client terminal over the data network, the client terminal adapted to receive the voice signal and providing a plurality of controls to enable a user at the client terminal to selectively play, stop and rewind the voice signal;

sending from the client terminal to the server a request to begin streaming the voice signal to the client terminal;

responsive to the request, the message server beginning to stream the voice signal to the client terminal for transcription by the user; and the user operating the controls and selectively listening to and transcribing the voice signal as the voice signal is being streamed over the network to the client terminal;

wherein the server may pause and stop streaming of the voice signal to the client terminal in response to instructions provided from the client terminal.

13. A method as claimed in claim 12, wherein, before the message server streams the voice signal to the client terminal, the message server authenticates the user.

14. A method as claimed in claim 12, wherein the data network is a local area network.

15. A method as claimed in claim 12, wherein the data network is a packet switched network, and wherein streaming the voice signal to the client terminal comprises transmitting packets representative of the voice signal.

16. A method as claimed in claim 15, wherein the data network is a TCP/IP network.

17. A method as claimed in claim 15, wherein the data network is an intranet.

18. A method as claimed in claim 15, wherein the data network is the Internet.

19. A method as claimed in claim 15, wherein the client terminal communicates with the data network via a point-to-point protocol.

20. A method as claimed in claim 12, wherein recording the voice signal on the storage medium comprises recording the voice signal in a digital format, and wherein the client terminal is a digital computer operating a streaming-player application adapted to receive and play streamed audio signals, the streaming-player application providing said controls.

21. A system for providing network based transcription of a voice signal comprising, in combination:

a file store;

a server in a data network, the server being coupled with the file store, and the server receiving a first digital audio file representative of the voice signal and storing the first digital audio file in the file store;

a client terminal in the data network, the client terminal adapted to receive streamed digital audio files from the data network and including a plurality of streaming controls to enable a user at the client terminal to selectively play the digital audio files;

the server further adapted to receive a request from the client terminal to stream the first digital audio file over the data network to the client terminal, and, responsive to the request, said server beginning to stream the first digital audio file over the data network to the client terminal;

wherein, as the streamed digital audio file arrives at the client terminal, (i) the client terminal receives the digital audio file and audibly plays the voice signal represented by the digital audio file, and (ii) a user at the client terminal transcribes the voice signal audibly played by the client terminal; and wherein, the server may pause and stop streaming of the voice signal to the client terminal in response to instructions provided from the client terminal.

22. A system as claimed in claim 21, wherein the voice signal received by the server originates from a person providing a verbal response to a voice prompt.

23. A system as claimed in claim 22, wherein the voice prompt is associated with a promotional survey.

24. A system as claimed in claim 21, wherein the server receives the voice signal from a network voice capture device.

25. A system as claimed in claim 24, wherein the network voice capture device receives the voice signal from a subscriber device.

26. A system as claimed in claim 25, wherein the subscriber device is selected from the group consisting of a telephone and a computer.

27. A system as claimed in claim 21, wherein the client terminal is a digital computer operating a streaming-player application adapted to receive and play the voice signal, the streaming-player application providing the controls.

28. A system as claimed in claim 21, wherein the data network is a local area network.

29. A system as claimed in claim 21, wherein the data network is an intranet.

30. A system as claimed in claim 21, wherein the data network is the Internet.

31. A system as claimed in claim 21, wherein the data network is a packet switched network.

32. A system as claimed in claim 21, wherein the client terminal is coupled with the data network via a point-to-point protocol.

* * * * *